United States Patent
Bates et al.

(10) Patent No.: US 8,037,474 B2
(45) Date of Patent: Oct. 11, 2011

(54) TASK MANAGER WITH STORED TASK DEFINITION HAVING POINTER TO A MEMORY ADDRESS CONTAINING REQUIRED CODE DATA RELATED TO THE TASK FOR EXECUTION

(75) Inventors: John P. Bates, Redwood City, CA (US); Payton R. White, Foster City, CA (US); Richard B. Stenson, Foster City, CA (US); Howard Berkey, Oakland, CA (US); Atilla Vass, Foster City, CA (US); Mark Cerny, Los Angeles, CA (US); John Morgan, Santa Monica, CA (US)

(73) Assignee: Sony Computer Entertainment Inc., Tokyo (JP)

( * ) Notice: Subject to any disclaimer, the term of this patent is extended or adjusted under 35 U.S.C. 154(b) by 1381 days.

(21) Appl. No.: 11/238,087

(22) Filed: Sep. 27, 2005

(65) Prior Publication Data

US 2007/0074207 A1  Mar. 29, 2007

(51) Int. Cl.
*G06F 9/46* (2006.01)
*G06F 7/38* (2006.01)

(52) U.S. Cl. ........ 718/102; 712/220

(58) Field of Classification Search ........ 718/100, 718/102; 712/220
See application file for complete search history.

(56) References Cited

U.S. PATENT DOCUMENTS

| | | | |
|---|---|---|---|
| 3,496,551 A | 2/1970 | Driscoll et al. | 340/172.5 |
| 3,596,257 A * | 7/1971 | Patel | 711/171 |
| 5,047,923 A * | 9/1991 | Elstner et al. | 707/104.1 |
| 5,136,712 A * | 8/1992 | Perazzoli et al. | 718/104 |
| 5,185,694 A | 2/1993 | Edenfield et al. | |
| 5,452,452 A | 9/1995 | Gaetner et al. | 395/650 |
| 5,504,901 A * | 4/1996 | Peterson | 717/144 |
| 5,528,513 A | 6/1996 | Vaitzblit et al. | |
| 5,592,671 A * | 1/1997 | Hirayama | 718/104 |
| 5,745,778 A | 4/1998 | Alfieri | 395/800.01 |
| 5,794,017 A | 8/1998 | Evans et al. | 395/507 |
| 5,826,081 A | 10/1998 | Zolnowsky | |
| 5,832,262 A | 11/1998 | Johnson et al. | 395/672 |

(Continued)

FOREIGN PATENT DOCUMENTS

EP  459931 A2 * 12/1991

(Continued)

OTHER PUBLICATIONS

Office Action (Final) dated Apr. 20, 2009 for U.S. Appl. No. 11/238,086.

(Continued)

*Primary Examiner* — Meng An
*Assistant Examiner* — Blake Kumabe
(74) *Attorney, Agent, or Firm* — Joshua D. Isenberg; JDI Patent

(57) ABSTRACT

Cell processor task management in a cell processor having a main memory, one or more power processor units (PPU) and one or more synergistic processing units (SPU), each SPU having a processor and a local memory is described. An SPU task manager (STM) running on one or more of the SPUs reads one or more task definitions stored in the main memory into the local memory of a selected SPU. Based on information contained in the task definitions the SPU loads code and/or data related to the task definitions from the main memory into the local memory associated with the selected SPU. The selected SPU then performs one or more tasks using the code and/or data.

58 Claims, 11 Drawing Sheets

U.S. PATENT DOCUMENTS

| | | | |
|---|---|---|---|
| 6,003,112 A | 12/1999 | Tetrick | |
| 6,144,986 A | 11/2000 | Silver | |
| 6,279,040 B1 | 8/2001 | Ma et al. | |
| 6,289,369 B1 | 9/2001 | Sundaresan | 709/103 |
| 6,295,598 B1* | 9/2001 | Bertoni et al. | 712/28 |
| 6,341,324 B1 | 1/2002 | Caulk et al. | |
| 6,370,681 B1 | 4/2002 | Dellarocas et al. | |
| 6,378,072 B1 | 4/2002 | Collins et al. | |
| 6,463,457 B1 | 10/2002 | Armentrout et al. | |
| 6,526,491 B2* | 2/2003 | Suzuoki et al. | 711/164 |
| 6,665,699 B1 | 12/2003 | Hunter et al. | 709/102 |
| 6,665,783 B2 | 12/2003 | Zahir | |
| 6,728,959 B1 | 4/2004 | Merkey | 718/102 |
| 6,785,756 B2 | 8/2004 | Candea et al. | |
| 6,792,461 B1 | 9/2004 | Hericourt | |
| 7,024,671 B2 | 4/2006 | Yamashita | |
| 7,039,736 B2 | 5/2006 | Mantey et al. | |
| 7,058,750 B1 | 6/2006 | Rankin et al. | |
| 7,127,477 B2 | 10/2006 | Duncombe et al. | |
| 7,236,738 B2 | 6/2007 | Settle | |
| 7,236,998 B2 | 6/2007 | Nutter et al. | |
| 7,298,377 B2 | 11/2007 | Fossum et al. | |
| 7,304,646 B2 | 12/2007 | Iwata | |
| 7,321,958 B2 | 1/2008 | Hofstee et al. | |
| 7,478,390 B2 | 1/2009 | Brokenshire et al. | |
| 7,516,456 B2* | 4/2009 | Aguilar et al. | 718/102 |
| 7,522,168 B2 | 4/2009 | Stenson et al. | |
| 7,565,651 B1* | 7/2009 | Carey | 718/100 |
| 7,734,827 B2 | 6/2010 | Iwamoto | |
| 7,760,206 B2 | 7/2010 | Stenson et al. | |
| 2002/0138637 A1 | 9/2002 | Suzuoki et al. | 709/230 |
| 2002/0169907 A1 | 11/2002 | Candea et al. | |
| 2003/0154284 A1* | 8/2003 | Bernardin et al. | 709/226 |
| 2003/0195920 A1* | 10/2003 | Brenner et al. | 709/107 |
| 2004/0054883 A1 | 3/2004 | Goodman et al. | 713/1 |
| 2004/0208178 A1 | 10/2004 | Tuck et al. | |
| 2005/0081202 A1* | 4/2005 | Brokenshire et al. | 718/100 |
| 2005/0081203 A1* | 4/2005 | Aguilar et al. | 718/100 |
| 2005/0091473 A1 | 4/2005 | Aguilar et al. | |
| 2005/0188372 A1 | 8/2005 | Inoue et al. | 718/100 |
| 2005/0188373 A1 | 8/2005 | Inoue et al. | 718/100 |
| 2006/0190942 A1 | 8/2006 | Inoue et al. | |
| 2007/0198628 A1 | 8/2007 | Bates et al. | |
| 2009/0147013 A1 | 6/2009 | Stenson et al. | |
| 2009/0150634 A1 | 6/2009 | Labour et al. | |

FOREIGN PATENT DOCUMENTS

| | | |
|---|---|---|
| EP | 0 806 730 | 11/1997 |
| GB | 2394336 | 4/2004 |
| JP | 01-258135 | 10/1989 |
| JP | 10-55284 | 2/1998 |
| JP | 2001005679 | 1/2001 |
| JP | 2002007364 | 1/2002 |
| JP | 2004246702 | 9/2004 |
| JP | 2004320174 | 11/2004 |
| JP | 2005513587 | 5/2005 |
| JP | 2005235228 | 9/2005 |
| JP | 2005235229 | 9/2005 |
| WO | WO 97/06484 | 2/1997 |
| WO | 0203208 | 1/2002 |
| WO | WO 02/091180 | 11/2002 |
| WO | 2004015553 | 2/2004 |
| WO | WO 2004/084069 | 9/2004 |

OTHER PUBLICATIONS

Office Action (Final) dated May 7, 2009 for U.S. Appl. No. 11/257,761.
Sony Computer Entertainment Incorporated, "Cell Broadband Engine Architecture", Version 1.0, Aug. 8, 2005.
Pratit Santiprabhob et al. "Fuzzy Rule-Based Process Scheduling Method for Critical Distributed Computing Environment"—Proceedings 2003 IEEE, Mar. 8, 2003, vol. 5, pp. 52267-52276.
J. A. Kahle et al. "Introduction to the Cell Multiprocessor" IBM Journal of Research and Development, vol. 49, No. 4-5, , Jul. 2005, pp. 589-604.
George M. Candea et al. "Vassal: Loadable Scheduler Support for Multi-Policy Scheduling" Proceedings of the Usenix Window NT Symposium, Aug. 1998, pp. 157-166.
Alexandre E. Eichenberger et al., "Optimizing Compiler for a Cell Processor", Proceedings of 14$^{th}$ International Conference on Parallel Architectures and Compilation Techniques, 2005 (PACT'05), pp. 161-172.
B. Flachs et al., "A Streaming Processing Unit for a Cell Processor", 2005 IEEE International Solid-State Circuits Conference—Digest of Technical Papers, pp. 134-135.
Scott Whitman, "Dynamic Load Balancing for Parallel Polygon Rendering", IEEE Computer Graphics and Applications, vol. 14, No. 4, Jul. 1994, pp. 41-48.
Jaspal Subhlok et al., "Communication and Memory Requirements as the Basis for Mapping Task and Data Parallel Programs", Supercomputing' 94, Proceedings Washington, DC, 1994 IEEE, pp. 330-339.
Alan Heirich, "Optimal Automatic Multi-Pass Shader Partitioning by Dynamic Programming", Graphics Hardware (2005), pp. 91-98.
International application No. PCT/US2006/037345, "The International Search Report" and "The Written Opinion of the International Searching Authority".
International application No. PCT/US2006/037334, "The International Search Report and The Written Opinion of the International Searching Authority".
International application No. PCT/US2006/037336, "The International Search Report and The Written Opinion of the International Searching Authority".
International application No. PCT/US2006/037338, "The International Search Report and The Written Opinion of the International Searching Authority".
U.S. Appl. No. 11/238,077, entitled "Cell Processor Methods and Apparatus", to John P. Bates et al, filed Sep. 27, 2005.
U.S. Appl. No. 11/257,761, entitled "Secure Operation of Cell Processors", to Tatsuya Iwamoto, filed Oct. 24, 2005.
U.S. Appl. No. 11/238,085, entitled "Method and System for Performing Memory Copy Function on a Cell Processor", to Antoine Labour et al, filed Sep. 27, 2005.
U.S. Appl. No. 11/238,086, entitled "Operating Cell Processors Over a Network", to Tatsuya Iwamoto, filed Sep. 27, 2005.
U.S. Appl. No. 11/238,095, entitled "Cell Processor Task and Data Management", to Richard B. Stenson et al, filed Sep. 27, 2005.
D S Milojicic et al., "Process Migration" ACM Computing Surveys, ACM, New York, NY, US, vol. 32, No. 3, Sep. 2000, pp. 241-299, XP002254767 ISSN: 0360-0300.
K Chanchio et al., "Data Collection and Restoration for Heterogeneous Process Migration" Software Practice & Experience, Wiley & Sons, Bognor Regis, GB, vol. 32, No. 9, Jul. 25, 2002, pp. 845-871, XP001115308 ISSN: 0038-0644.
European Search Report for European application No. 06254919 dated Dec. 21, 2007.
Office Action dated Mar. 12, 2010 issued for U.S. Appl. No. 11/238,077.
William et al., "The Potential of the Cell Processor for Scientific Computing", Conference on Computing Frontiers, ACM, 2006, pp. 9-20.
Gschwind, "Chip Multiprocessing and the Cell Broadband Engine", ACM, 2006, pp. 1-8.
Office Action dated Jan. 10, 2008 issued for U.S. Appl. No. 11/238,095.
Final Office Action dated Jul. 29, 2008 issued for U.S. Appl. No. 11/238,095.
Notice of Allowance and Fee(s) Due dated Nov. 25, 2008 issued for U.S. Appl. No. 11/238,095.
Office Action dated Nov. 4, 2008 issued for U.S. Appl. No. 11/238,086.
Office Action dated Nov. 24, 2008 issued for U.S. Appl. No. 11/257,761.
Office Action dated Jun. 22, 2010 issued for U.S. Appl. No. 11/238,086.
Final Office Action dated Feb. 5, 2010 issued for U.S. Appl. No. 11/238,086.

Office Action dated Aug. 11, 2009 issued for U.S. Appl. No. 11/238,086.
Office Action dated May 13, 2008 issued for U.S. Appl. No. 11/238,086.
Notice of Allowance and Fee(s) Due dated Jan. 26, 2010 issued for U.S. Appl. No. 11/257,761.
U.S. Appl. No. 12/787,344, filed May 25, 2010.
Office Action dated Aug. 27, 2009 issued for U.S. Appl. No. 11/257,761.
Notice of Allowance and Fee Due(s) dated Nov. 3, 2008 issued for U.S. Appl. No. 11/238,085.
Final Office Action dated Aug. 5, 2008 issued for U.S. Appl. No. 11/238,085.
Office Action dated Feb. 20, 2008 issued for U.S. Appl. No. 11/238,085.
Office Action dated Aug. 30, 2007 issued for U.S. Appl. No. 11/238,085.
Notice of Allowance and Fee Due(s) dated Mar. 8, 2010 issued for U.S. Appl. No. 12/371,424.
Office Action dated Oct. 16, 2009 issued for U.S. Appl. No. 12/371,424.
U.S. Appl. No. 60/650,153, filed Feb. 4, 2005.
Office Action dated May 27, 2010 for Chinese patent application No. 200610142304.7 and its English translation.
Office Action dated May 6, 2010 for Chinese patent application No. 200610142305.1 and its English translation.
Office Action dated Sep. 29, 2010 issued for U.S. Appl. No. 11/461,390.
Final Office Action dated Nov. 8, 2010 issued for U.S. Appl. No. 11/238,086.
Office Action dated Nov. 15, 2010 issued for U.S. Appl. No. 12/796,601.
Advisory Action dated Oct. 15, 2010 issued for U.S. Appl. No. 11/238,077.
Office Action dated Jun. 4, 2010 issued for U.S. Appl. No. 12/372,665.
Final Office Action dated Sep. 27, 2010 issued for U.S. Appl. No. 12/372,665.
Advisory Action dated Dec. 9, 2010 issued for U.S. Appl. No. 12/372,665.
Final Office Action dated Dec. 17, 2010 issued for U.S. Appl. No. 12/372,665.
Notification of Reason(s) for Refusal dated Nov. 30, 2010 issued for Japanese Patent Application No. 2008-533492.
Notification of Reason(s) for Refusal dated Nov. 30, 2010 issued for Japanese Patent Application No. 2008-533495.
Final Office Action dated Aug. 5, 2010 issued for U.S. Appl. No. 11/238,077.
Office Action dated Aug. 16, 2010 for Japanese patent application No. 2006-262024 and its English translation.
Office Action dated Aug. 16, 2010 for Japanese patent application No. 2006-262023 and its English translation.

* cited by examiner

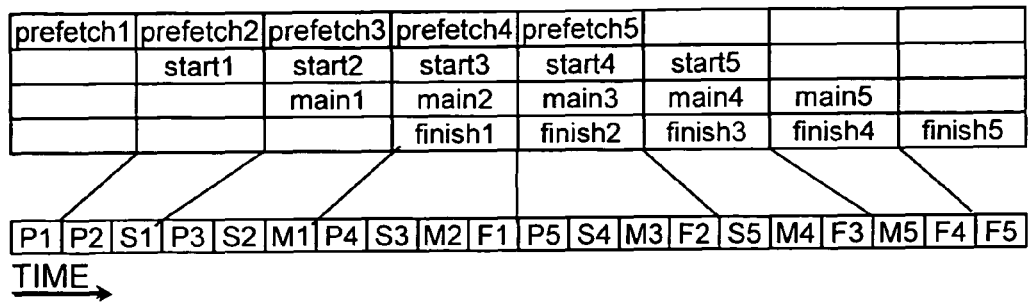
Parallel DMA operations and task execution are shown below.
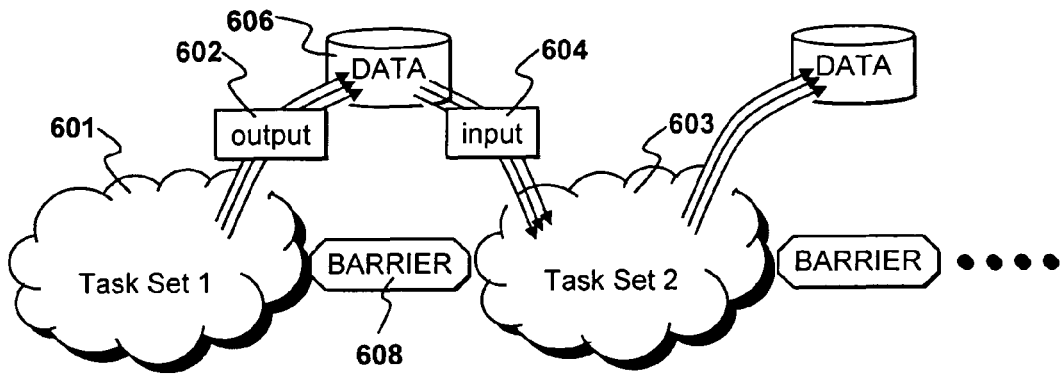
FIG. 5
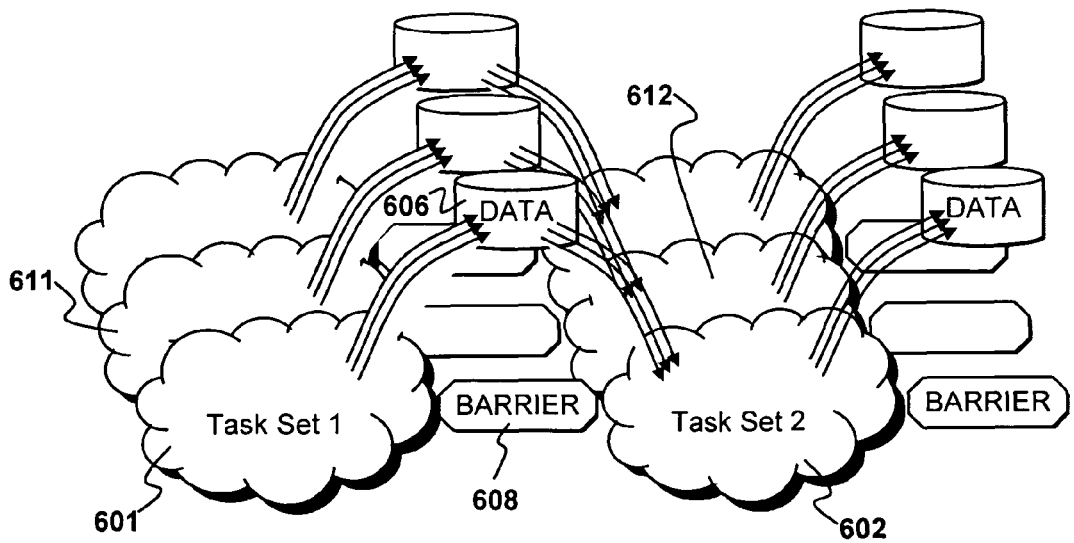
FIG. 6A
FIG. 6B

```
// Macros define necessary symbols for objcopy spu elf
EXTERN_SPU_PROGRAM(spu_program);

int main(int argc, char** argv)
{
  ret = spu_initialize(6, 6);

// create spu task manager
  st_manager* stm = st_new_manager(NUM_SPU);

// set the path to the spu kernel
  st_set_kernel_program(stm, "spu.elf");

// If tasks will be using the shared output buffer
  // st_set_shared_output_size(stm, 1024*5000);

// How many tasks the SPUs DMA in to choose from
  // (16 bytes each required of Local Store)
  st_set_max_dma_tasks(stm, 32);

// Of the number above, how many tasks can
  // the SPU take at one time.
  st_set_max_grab_tasks(stm, 32);

// launch the spus - after this call,
  // SPUs will be looking for tasks
  st_launch_spus(stm);

// add a spu program image using the objcopy symbols
  void* spu_program = st_add_plugin_image(stm,
                        "spu_program.elf",
                        SPU_PROGRAM_IMAGE(spu_program),
                        SPU_PROGRAM_SIZE(spu_program) );

```
MyTaskDef tasks[NUM_TASKS];     // Task definitions
SpuTask queueEls[NUM_TASKS];    // Task Queue elements // Initialize task definitions
void initTasks()
{
  for(int i=0; i<NUM_TASKS; ++i)
  {
    // Initialize custom data
    tasks[i].parameter = /*...*/;
    st_init_task(&queueEls[i],     // task pointer
                 &tasks[i],         // task definition
                 15,                // tag
                 spu_program);      // SPU Program
}

// Each frame
{
  st_task_list_lock(stm);
  st_add_task_group(stm, tasks, NUM_TASKS);

// To determine when above group of tasks completes,
  // add a barrier task.
  int finish_id;
  st_add_barrier(stm,
                 &finish_id,     // for barrier ID
                 1<<15);         // tag mask for tag 15
  st_task_list_unlock(stm);

// ---- OTHER PPU WORK HERE ----

// Wait for barrier to finish
  while(st_check_and_clear_task(stm, finish_id) == 0);
}
```

FIG. 9B

```
#include "spu_task_context.h"
#include "MyTaskData.h"

unsigned int TaskDefSize = sizeof(MyTaskData);
unsigned int ContextSize = 16*1024;

void prefetch(SpuTaskContext* sti)
{
  // Start Task Def. DMA.
  dmaGet(sti->taskdef, sizeof(MyTaskData), /*...*/);
} void start(SpuTaskContext* sti)
{
  // Start input DMA.
  dmaWait(sti->dmaTag);
  MyTaskData* mydata = (MyTaskData*)sti->taskdef;
  dmaGet(sti->context, mydata->inputEA, /*...*/);
} int spumain(SpuTaskContext* sti)
{
  MyTaskData* mydata = (MyTaskData*)sti->taskdef;

// Wait for input DMA to complete.
  dmaWait(sti->dmaTag);

// ---- PRODUCE OUTPUT DATA ----

// Start output DMA back to main memory.
  dmaPut(sti->context, /*...*/, sti->dmaTag);

return 0;
} void finish(SpuTaskContext* sti)
{
  // Wait for output DMA.
  dmaWait(sti->dmaTag);
}
```

TASK MANAGER WITH STORED TASK DEFINITION HAVING POINTER TO A MEMORY ADDRESS CONTAINING REQUIRED CODE DATA RELATED TO THE TASK FOR EXECUTION

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but other-wise reserves all copyright rights whatsoever.

CROSS-REFERENCE TO RELATED APPLICATIONS

This application is related to commonly-assigned U.S. patent application Ser. No. 11/238,077 entitled "CELL PROCESSOR METHODS AND APPARATUS" to John P. Bates, Payton R. White and Attila Vass, which is filed the same day as the present application, the entire disclosures of which are incorporated herein by reference.

This application is also related to commonly-assigned U.S. patent application Ser. No. 11/238,095 entitled "CELL PROCESSOR TASK AND DATA MANAGEMENT" to Richard B. Stenson and John P. Bates, which is filed the same day as the present application, the entire disclosures of which are incorporated herein by reference.

This application is also related to commonly-assigned U.S. patent application Ser. No. 11/238,086 entitled "OPERATING CELL PROCESSORS OVER A NETWORK" to Tatsuya Iwamoto, which is filed the same day as the present application, the entire disclosures of which are incorporated herein by reference.

This application is also related to commonly-assigned U.S. patent application Ser. No. 11/238,085 entitled "METHOD AND SYSTEM FOR PERFORMING MEMORY COPY FUNCTION ON A CELL PROCESSOR" to Antoine Labour, John P. Bates and Richard B. Stenson, which is filed the same day as the present application, the entire disclosures of which are incorporated herein by reference.

FIELD OF THE INVENTION

This invention generally relates to parallel processing and more particularly to managing tasks in cell processors.

BACKGROUND OF THE INVENTION

Major advance in electronic computation has been the development of systems that can perform multiple operations simultaneously. Such systems are said to perform parallel processing. Recently, cell processors have been developed to implement parallel processing on electronic devices ranging from handheld game devices to main frame computers. A typical cell processor has a power processor unit (PPU) and up to 8 additional processors referred to as synergistic processing units (SPU). Each SPU is typically a single chip or part of a single chip containing a main processor and a co-processor. All of the SPUs and the PPU can access a main memory, e.g., through a memory flow controller (MFC). The SPUs can perform parallel processing of operations in conjunction with a program running on the main processor. A small local memory (typically about 256 kilobytes) is associated with each of the SPUs. This memory must be managed by software to transfer code and data to/from the local SPU memories.

The SPU have a number of advantages in parallel processing applications. For example, the SPU are independent processors that can execute code with minimal involvement from the PPU. Each SPU has a high direct memory access (DMA) bandwidth to RAM. An SPU can typically access the main memory faster than the PPU. In addition each SPU has relatively fast access to its associated local store. The SPU also have limitations that can make it difficult to optimize SPU processing. For example, the SPU cannot implement symmetric multiprocessing (SMP), have no shared memory and no hardware cache. In addition, common programming models do not work well on SPU.

A typical SPU process involves retrieving code and/or data from the main memory, executing the code on the SPU to manipulate the data, and outputting the data to main memory or, in some cases, another SPU. To achieve high SPU performance it is desirable to optimize the above SPU process in relatively complex processing applications. For example, in applications such as computer graphics processing SPUs typically execute tasks thousands of times per frame. A given task may involve varying SPU code, vary data block numbers and sizes. For high performance, it is desirable to manage the transfer of SPU code and data from SPU software with little PPU software involvement. There are many techniques for managing code and data from the SPU. Often, different techniques for managing code and data from the SPU need to operate simultaneously on a cell processor. There are many programming models for SPU-driven task management. Unfortunately, no single task system is right for all applications.

One prior art task management system used for cell processors is known as SPU Threads. A "thread" generally refers to a part of a program that can execute independently of other parts. Operating systems that support multithreading enable programmers to design programs whose threaded parts can execute concurrently. SPU Threads operates by regarding the SPUs in a cell as processors for threads. A context switch may swap out the contents of an SPU's local storage to the main memory and substitute 256 kilobytes of data and/or code into the local storage from the main memory where the substitute data and code are processed by the SPU. A context switch is the computing process of storing and restoring the state of a SPU or PPU (the context) such that multiple processes can share a single resource. Context switches are usually computationally intensive and much of the design of operating systems is to optimize the use of context switches.

Unfortunately, interoperating with SPU Threads is not an option for high-performance applications. Applications based on SPU Threads have large bandwidth requirements and are processed from the PPU. Consequently SPU-threads based applications are not autonomous and tend to be slow. Because SPU Threads are managed from the PPU, SPU context switching (swapping out the current running process on an SPU to another waiting process) takes too long. Avoiding PPU involvement in SPU management can lead to much better performance for certain applications To overcome these problems a system referred to as SPU Runtime System (SPURS) was developed. In SPURS, the memory of each SPU has loaded into it a kernel that performs scheduling of tasks handled by the SPU. Unfortunately, SPURS, like SPU Threads, uses context switches to swap work in and out of the SPUs. The work is performed on the SPUs rather than the PPU so that unlike in SPU Threads there is autonomy of processing. However, SPURS suffers from the same overhead of context switches as SPU Threads. Thus, although SPURS provides autonomy it is not suitable for many use cases.

SPURS is just one example of an SPU task system. Middleware and applications will require various task systems for various purposes. Currently, SPURS runs as a group of SPU Threads, so that it can interoperate with other SPU Threads. Unfortunately, as stated above, SPU Threads has undesirable overhead, so using it for the interoperation of SPU task systems is not an option for certain high-performance applications.

In cell processing, it is desirable for middleware and applications to share SPUs using various task systems. It is desirable to provide resources to many task classes, e.g., audio, graphics, artificial intelligence (AI) or for physics such as cloth modeling, fluid modeling, or rigid body dynamics. To do this efficiently the programming model needs to manage both code and data. It is a challenge to get SPU middleware to interoperate with no common task system. Unfortunately, SPU Threads and SPURS follow the same programming model and neither model provides enough performance for many use cases. Thus, application developers still have to figure out how to share limited memory space on the SPUs between code and data.

Thus, there is a need in the art, for a cell processor method and apparatus that overcomes the above disadvantages. It would be desirable to implement SPU task management using a software model that is easy to use and that stresses the SPUs merits. It would also be desirable to be able to implement SMP with software code and/or data cached on the SPU.

SUMMARY OF THE INVENTION

Embodiments of the present invention are directed to a cell processor task management in a cell processor having a main memory, one or more power processor units (PPU) and one or more synergistic processing units (SPU), each SPU having a processor and a local memory, a method for managing tasks to be executed by the one or more of the SPUs. An SPU task manager (STM) running on one or more of the SPUs reads one or more task definitions stored in the main memory into the local memory of a selected SPU. Based on information contained in the task definitions the SPU loads code and/or data related to the task definitions from the main memory into the local memory associated with the selected SPU. The selected SPU then performs one or more tasks using the code and/or data.

BRIEF DESCRIPTION OF THE DRAWINGS

The teachings of the present invention can be readily understood by considering the following detailed description in conjunction with the accompanying drawings, in which:

FIG. 5 is a block diagram illustrating multi-buffering operation of a cell processor SPU according to an embodiment of the present invention.

FIG. 6A is a schematic diagram illustrating task synchronization using barrier commands according to an embodiment of the present invention.

FIG. 6B is a schematic diagram illustrating the use of tag-group barriers according to an embodiment of the present invention.

FIGS. 9A-9C are listings of cell processor code for implementing embodiments of the present invention.

DESCRIPTION OF THE SPECIFIC EMBODIMENTS

Although the following detailed description contains many specific details for the purposes of illustration, anyone of ordinary skill in the art will appreciate that many variations and alterations to the following details are within the scope of the invention. Accordingly, the exemplary embodiments of the invention described below are set forth without any loss of generality to, and without imposing limitations upon, the claimed invention.

It is desirable for embodiments of the present invention to achieve high performance with a cell processor. Preferably SPU task management according to embodiments of the present invention is complete, i.e., it works for all use cases and is scalable, i.e., performance scales with the number of SPUs. In addition, it is desirable for embodiments of the present invention to implement SPU task management efficiently, with low PPU usage, low memory useage and low DMA bandwidth usage.

Figure 1:
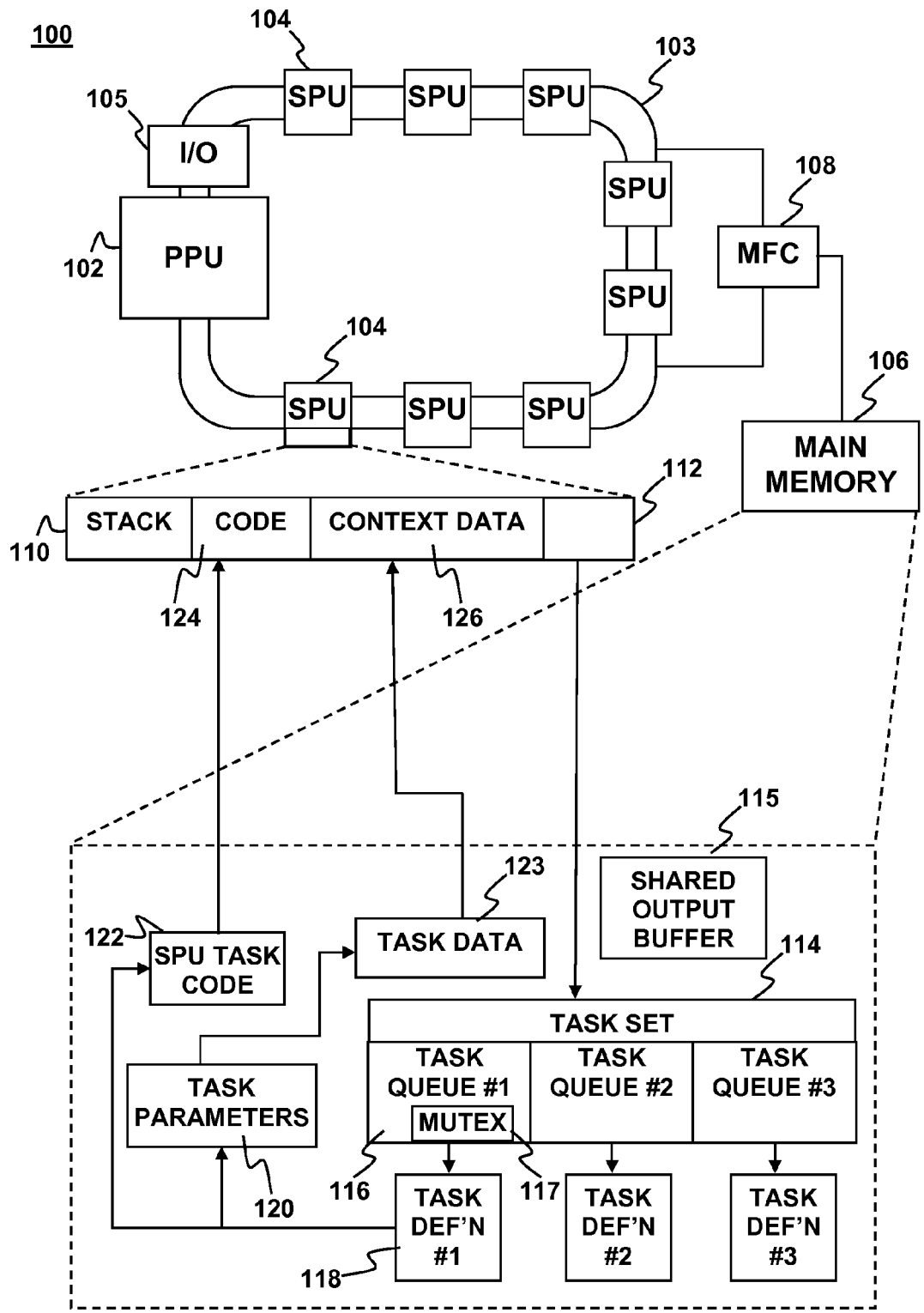
FIG. 1 is a schematic diagram of a cell processor according to an embodiment of the present invention.

FIG. 1 is a schematic depiction of a cell processor 100. According to an embodiment of the present invention, the cell processor 100 generally includes a power processor unit (PPU) 102 and several synergistic processing units (SPU) 104. In FIG. 1, a single PPU 102 and eight SPU 104 are shown for the sake of example. Cell processors having two or more PPU and a greater or lesser number of SPU may be used in conjunction with embodiments of the present invention.

The PPU 102 acts as a controller for the SPUs 104, which handle most of the computational workload. The PPU 102 may also be used to run conventional operating systems if it is sufficiently similar to other 64-bit PowerPC processors, and if the SPUs 104 are designed for vectorized floating point code execution. By way of example, the PPU 102 may contain a 32 KiB instruction and data Level 1 cache and a 512 KiB level 2 cache.

The PPU 102, SPUs 104 and main memory 106 can exchange code and data with each other over an exchange interface bus (EIB) 103. The PPU 102 and SPUS 104 can also exchange code and data stored in a main memory 106, e.g., via the EIB 103 and a memory flow controller (MFC) 108 such as a digital memory access (DMA) unit or the like. The EIB 103 may be a circular bus having two channels in opposite directions. The EIB 103 may also be connected to the Level 2 cache, the MFC 108, and a system interface 105 such as a FlexIO for external communications.

Each SPU 104 includes a local memory 110. Code and data obtained from the main memory 106 can be loaded into the local memory 110 so that the SPU 104 can process tasks. As shown in the inset, a software manager referred to herein as an SPU Task Manager (STM) 112 resides in the local memory 110 of each SPU 104. Preferably, the STM 112 takes up only a small fraction of the total memory space available in each local memory 110. The heart of SPMM 112 is referred to as an "STM Kernel", which typically takes up about 16 KB resident on each SPU. For a 256K local storage, this represents about 6% SPU Local Store usage.

By way of example, policy modules and work queues may be associated as follows. As shown in the lower inset in FIG. 1, the main memory 106 may contain a task set 114 having a set of task queues 116. Each task queue 116 includes one or more task queue elements, which include pointers to one or more task definitions 118. The PPU 102 can add new task queues to the task set 114 but has little other involvement with the management of the task set 114. Tasks may be added to the task queue 116 from the application running on the PPU 102. An operating system mutex, such as a Lv2OS mutex may be used for PPU thread contention. In addition the SPU 104 can also schedule new tasks. Each time a task is added to a task queue, it will execute once without interruption. The PPU 102 typically does not interrupt a task while it is being processed. The PPU application may poll the task queue 116 for completion of tasks. For example, when a "checked" task completes, the STM kernel 112 set a bit in an atomic. The bit can be polled from the PPU 102 using the API.

When the task queues 116 are empty, the SPU kernel on each SPU 104 waits on an atomic reservation lost event. The SPUs 104 notify the atomic mutex 117 of completion of "checked" tasks. By way of example, the atomic mutex may include 4 bytes of atomic used for a lock state, 2 bytes used for a completed task count and 122 bytes containing states for up to 488 tasks. The 122 bytes may include two bits per task: 1 for reservation, 1 for the state (e.g., waiting, processing or completed). Notification should be used sparingly. STM tasks can optionally notify a waiting PPU thread using the SPU Threads event queue. The latency for this technique (the time it takes from when the SPU sends the event to when the PPU thread is notified) however, can be significantly longer, e.g., about 100 times longer, than atomic notification.

The task definitions 118, may include pointers to memory locations containing task parameters 120 and SPU task code image 122. The code image 122 may be in the form of one or more executable linkable format (ELF) images of the requisite code. The task parameters 120 may include information related to the task, including, but not limited to input/output (I/O) addresses, I/O sizes, addresses for input and output task data 123 and the like. The STM kernel 112 loads code 124 into the SPU 104 using the code image 122 and parameters 120 the SPU 104 where they are stored as context data 126. The SPU 104 can then run the code 124 to load and process the task data 123. The main memory 106 may include an optional shared output buffer 115 to accommodate SPU programs having varying output data size. When such a task completes, the PPU 102 can retrieve its output data through the STM PPU application programming interface (API).

Many of the features described herein can be implemented through appropriate configuration of the STM kernel 112. In embodiments of the present invention there is no PPU runtime for the STM kernel 112. In general the STM kernel 112 gets task definitions 118 from the shared task queues 116 in main memory 106. The size of a task queue 116 varies depending on usage. Each time a task is added to a queue, it will execute once without interruption. Multiple task queues 116 can be created and grouped into one or more task sets 114. Each task queue 116 can be assigned a priority. The STM kernel 112 can select higher priority queues for processing before lower priority queues. When processing queues of equal priority, the SPUs will try to work on different queues to reduce contention. If a higher priority queue becomes ready, the next available SPU will begin processing it. As used herein contention refers to the number of SPU 104 that are working on a given task queue 116. Depending on the type of work, there may be a maximum number of SPUs 104 that can work on a given task queue 116. This number may be stored as part of a task definition 118. Certain types of work require two or more SPUs for efficient processing. In such cases, the output of one SPU may be forwarded to a second SPU for further processing. To address such cases, it is useful to define a minimum contention, i.e., a minimum number of SPUs needed to process the work. This number can also be stored as part of the task definition 118.

Table I represents one possible task definition, among others. The particular contents of work definitions data structures may vary from that of Table I. For example, the Task parameters are optional. Furthermore, if a task does not require synchronization, barrier tag group information is not required.

TABLE I

| Bytes | Task Queue Element |
|---|---|
| 4 | SPU Program Address |
| 3 | SPU Program Local Store Usage |
| 1 | Task Type (ex: task or barrier) |
| 4 | Task Definition Address or Barrier Mask |
| 3 | Task ID |
| 1 | Barrier Tag Group |
| 48 | Task Parameters - configurable by application - e.g., I/O addresses, arguments of associated functions (optional) |

When the STM Kernel 112 needs more tasks, it DMAs a number of Task Definitions from the front of the task queue. The task queues 116 may be circular, and can dynamically grow when tasks are added from the PPU 102 or SPU 104. In a circular queue, tasks are added to the end of the queue and taken from the beginning The tasks fill up the space available and then "wrap around" to occupy memory space that becomes available as tasks are removed from the end of the queue. The task queue may use an atomic mutex 117 to synchronize access to each queue. By way of example the atomic mutex may be a 128-byte atomic mutex. Pointers and indices for the task queue 116 can be stored in this atomic. The atomic mutex 117 generally includes one or more bits that indicate whether access to the task queue 116 is locked or not. The mutex 117 may also include one or more bytes of data that provide information about what other tasks in the task queue are in progress and/or the location of those tasks. The mutex 117 may also include one or more bytes for a counter that can be incremented or decremented to notify other SPU 104 or the PPU 102 which tasks in the task queue 116 have been taken.

With many independent tasks, the performance of the processor 100 tends to scale linearly with the number of SPUs 104. No change to application data management is necessary when changing the number of allocated SPUs 104. The SPUs 104 automatically load balance by getting more tasks whenever they run out. With multiple task queues 116, contention overhead is reduced.

Figure 2:
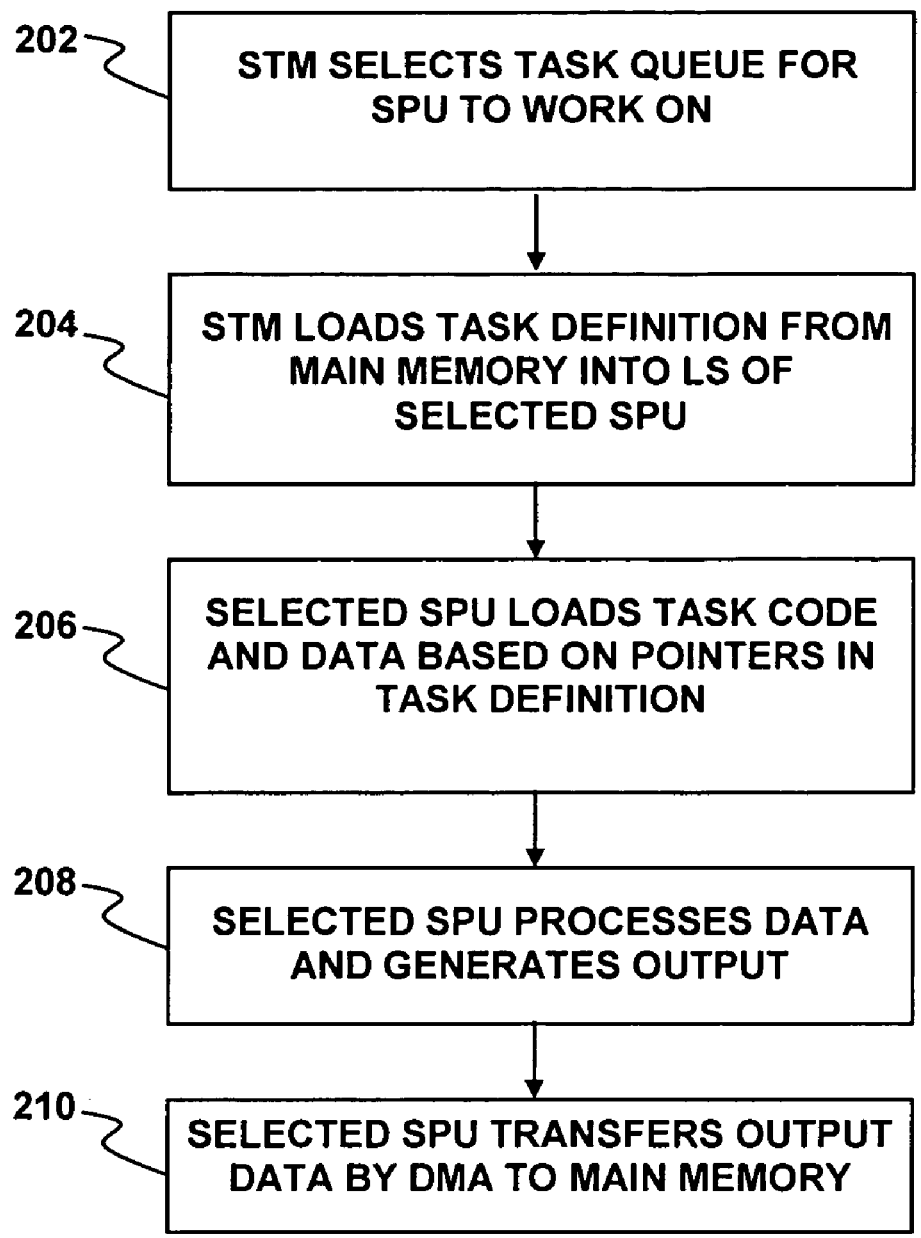
FIG. 2 is a flow diagram illustrating cell processor operation according to an embodiment of the present invention.
Figure 3:
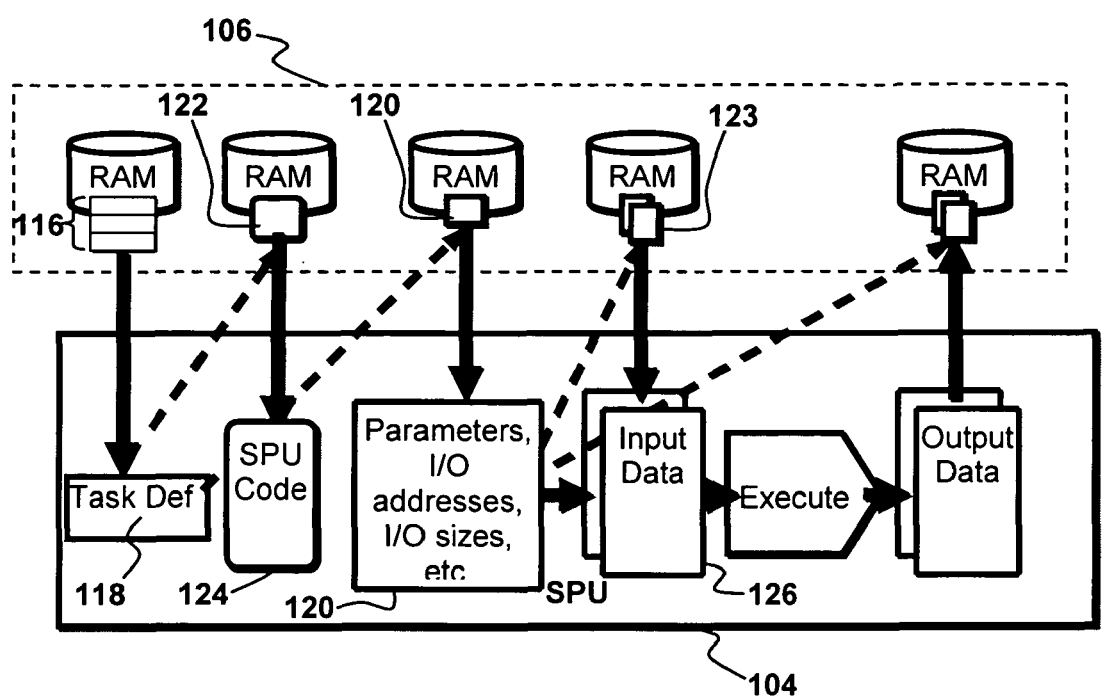
FIG. 3 is a schematic diagram illustrating cell processor operation according to an embodiment of the present invention.

FIG. 2 is a flow diagram illustrating a method 200 of processing with the cell processor 100 of FIG. 1. FIG. 3 is a schematic diagram illustrating in block from certain components of the cell processor 100. Operation of the cell processor 100 may be understood with reference to FIG. 1 and FIG.

3. At step 202 the STM kernel 112 running on one of the SPUs 104 selects a task queue 116 from the task set 114. Selection of the task queue may be based on priority, with higher priority queues being processed before lower priority queues.

Once the task queue 116 has been selected the STM kernel 112 reads a task definition 118 from the task queue 116 at step 204. Task definitions may be taken in an order determined by the task queue. The STM skips task definitions that have already been taken by other SPUs. Information in the task definition 118 directs the STM to main memory addresses corresponding to the SPU task parameters 120 and task code image 122. At 206 the SPU loads the SPU task code 124. The SPU 104 can use the parameters 120 and code 124 to load the task data 123 in the SPU local store 110 as input data 126. At 208 the SPU 104 uses the code 124 to process the input data 126 and generate output data 128. At 210, the output data 128 may be stored at an address in the main memory 106 or may be transferred to another SPU 104 for further processing.

The code 124 may include one or more SPU programs. As used herein, an SPU program refers to code that can be used by the SPU to implement one or more SPU tasks. In certain embodiments of the present invention, multiple SPU programs can be cached for use by the SPU 104 in processing the data 123 or for processing data for subsequent tasks. Such caching of programs can be used to optimize DMA use and reduce the number of times that the SPU 104 must access the main memory 106 to load code. SPU Programs may be dynamically loaded into main memory from through a PPU API. SPU Program ELF data may be loaded from memory (as a PPU symbol) 106 or from a file. The SPU task definition 118 can be created with reference SPU programs Loaded in main memory. The SPU programs are loaded into main memory once, at the start of the application. They can then be transferred by DMA to SPU local store 110 as needed by tasks.

Figure 4A:
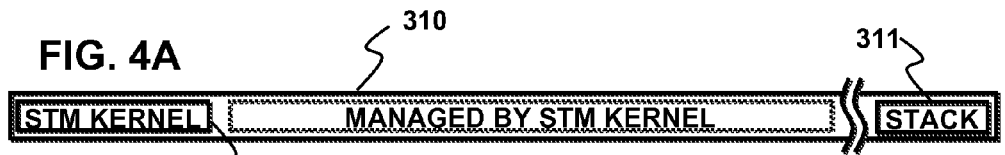
FIGS. 4A-4G are block diagrams depicting SPU memory configurations according to embodiments of the present invention.
Figure 4B:
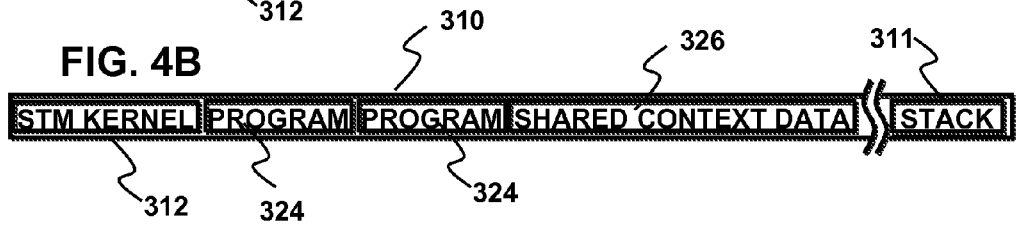
Figure 4C:
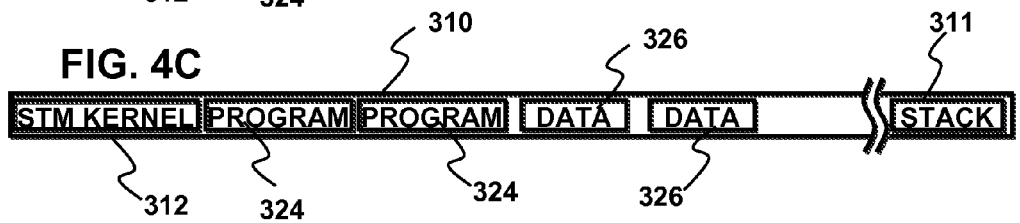

In embodiments of the present invention SPU programs may be characterized as being of one of two types, referred to herein as Type-1 and Type-2 respectively. Type-1 SPU programs utilize Position Independent Code (PIC), i.e., code that can execute at different locations in memory. PIC is commonly used for shared libraries, so that the same library code can be mapped to a location in each application (e.g., using a virtual memory system) where it won't overlap the application or other shared libraries. Programs may be further characterized by static local store usage, i.e., the Type-1 code does not allocate memory for use during runtime. As shown in FIG. 4A, for Type-1 programs are managed in a local store 310 of an SPU Type-1 by the STM kernel. As shown in FIG. 4B Multiple Type-1 programs 324 can be loaded simultaneously on the SPU local store 310. Type-1 programs may also be characterized by a stack 311 having a constant stack limit. Type-1 program code and context data reside in the remaining space in the LS 310 that is not occupied by the STM kernel 312 or the stack 311. As shown in FIG. 4C, Type-1 programs 324 can cache data 326 to share between programs and tasks.

Type-1 programs are higher performance use programs, though they tend to have more restrictions. An example of a Type-1 program 324 that can be cached is a MEM COPY program. This program takes advantage of the fact that memory transfers can be handled much faster by DMA using the SPU 104 than by the PPU 102. The MEM COPY takes advantage of this by using an available SPU to transfer data from one location in the main memory 106 to another location. Such SPU-based main memory management is particularly advantageous, e.g., where data needs to be aligned before DMA transfer from the main memory to an SPU or elsewhere. Examples of MEM COPY programs are described in commonly-assigned U.S. patent application Ser. No. 11/238,085 entitled "METHOD AND SYSTEM FOR PERFORMING MEMORY COPY FUNCTION ON A CELL PROCESSOR" to Antoine Labour, John P. Bates and Richard B. Stenson, which is filed the same day as the present application, the entire disclosures of which have been incorporated herein by reference.

Figure 4D:
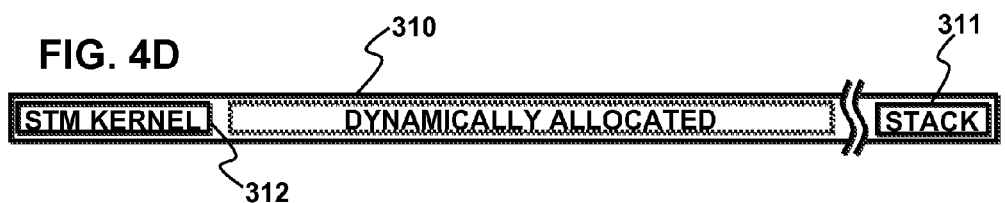
Figure 4E:
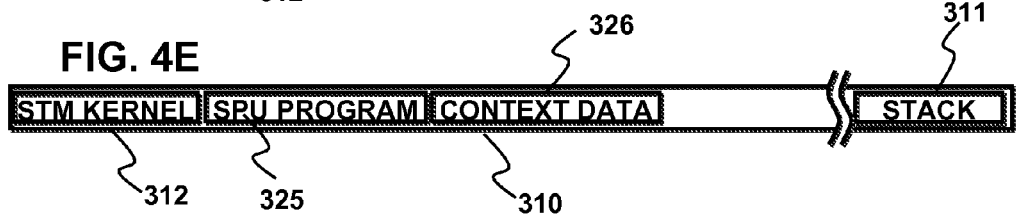
Figure 4F:
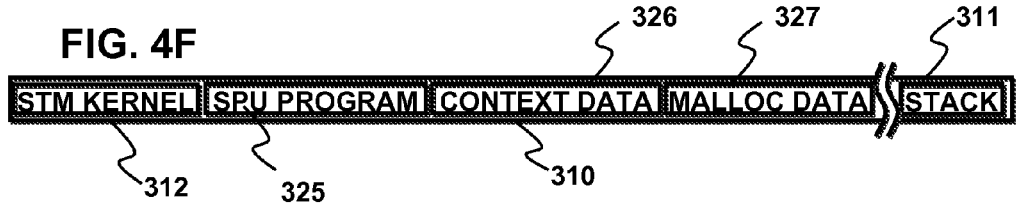

Type-2 programs are characterized by the fact that they may use non-position independent code (non-PIC) and may dynamically allocate local store space at SPU runtime. Typically, only one Type-2 program is loaded on one SPU at a time, although exceptions to this feature are within the scope of embodiments of the present invention. As shown in FIG. 4D for a Type-2 program, the local store 310 includes an area of memory that is dynamically allocated by the program at runtime. As shown in FIG. 4E, this area may include Type-2 SPU program code 325 and context data 326. Furthermore, as shown in FIG. 4F the dynamically allocated area of the local store 310 may also contain malloc data 327. The malloc function is used to dynamically allocate memory space in the programming language known as C. The malloc function accesses this block of memory via a pointer. When the memory is no longer needed, the pointer is passed to "free" and the memory can be reused by the system. Type-2 programs determine how the leftover local store space is allocated among globals, stack, and/or malloc. Furthermore, unlike the Type-1 program the size of the stack 311 for a Type-2 program is variable. Type-2 programs are particularly suitable for situations where it is desired to load the program code on the SPU and then select tasks that match the program code. The STM kernel 312 can load another program if it looks far ahead in the task queue and finds nothing that matches.

Figure 4G:
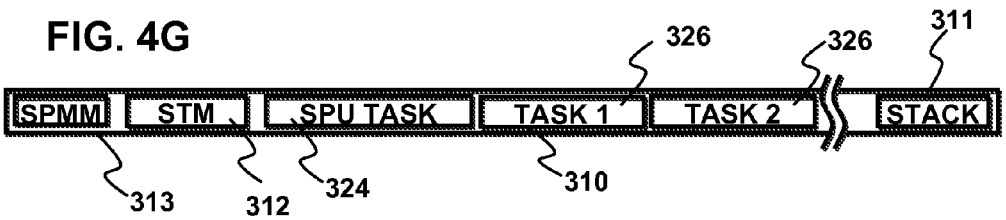

FIG. 4G depicts a memory map of local storage 310 for an SPU in which the STM kernel 312 is implemented as a policy under SPMM 313. The STM kernel 312 manages an SPU program 324 and data 326 for one or more tasks. Running the STM kernel as a policy under SPMM allows flexibility where other policies, such as SPURS or SPU threads or developer-designed custom policies are also to be implemented. SPMM is described in detail in commonly assigned U.S. patent application Ser. No. 11/238,077 entitled "CELL PROCESSOR METHODS AND APPARATUS" to John P. Bates, Payton R. White and Attila Vass, which is filed the same day as the present application, the entire disclosures of which are incorporated herein by reference.

SPU programs of type-1 and type-2 have some common features. Specifically, the size of task definitions 118 must be specified. In addition, the maximum local store space required for I/O DMA data must be specified. This enables the kernel 112 to manage the local store context data for tasks. SPU Tasks typically share a context buffer for task definitions 118 and I/O data. Type-1 and/or Type-2 programs may written in any suitable language, e.g., C or C++. Programs may be linked and undefined symbols in SPU Programs that exist in the SPU Kernel can be linked at runtime to the kernel symbols.

SPU Programs can have four customizable callbacks referred to herein as prefetch, start, spumain and finish. The prefetch callback has the syntax prefetch(SpuTaskContext*), where the quantity in parentheses is a pointer to the information about the task, including the main memory address of the task definition and a DMA tag for I/O data transfers 118. The SpuTaskContext is a local pointer to information about the current task. This data is necessary for the SPU Program to perform the task. The STM Kernel 112 prepares this data and delivers it to each callback in the SPU Program. SpuTaskContext contains the address in main memory 106 of this task's Task Definition. The task can use that address to DMA the task definition 118. SpuTaskContext may also contain a temporary Local Store buffer that the SPU Program can use in each of the 4 stages of the task. This callback directs the SPU 104 to start DMA transfer of the task definition 118 from the task queue. The start callback has the syntax: start(SpuTaskContext*). This callback causes the SPU 104 to wait for completion of task definition DMA and to start input DMA of code and/or data as determined by the task definition 118. The spumain callback has the syntax spumain(SpuTaskContext*), where the quantity in parentheses refers to the same data as the previous callback. This callback causes the SPU 104 to wait for completion of the input DMA, process the input data and start DMA of corresponding output data. The finish callback has the syntax: finish(SpuTaskContext*), where the quantity in parentheses refers to the same data as the previous callback.

Embodiments of the present invention allow efficient management of code and data through a process referred to herein as multi buffering. Multi buffering takes advantage of certain characteristics of the SPU. Specifically, an SPU can perform more than one DMA operation at a time and can perform DMA operations while the SPU program is executing. In multi buffering, the STM Kernel interleaves task callbacks so that DMA operations will be in progress during main execution. FIG. 5 illustrates an example of multi buffering. In this example a single SPU performs 5 tasks. For each task, the SPU must prefetch the task definition, start DMA of the requisite data and/or code, execute the main SPU code to generate output and finish by transferring the output by DMA. The upper chart in FIG. 5 illustrates SPU operations that occur in parallel, i.e., to some extent overlapping in time. The middle chart shows the order in which the callbacks are initiated and the bottom chart illustrates the overlap in time of the different tasks as they execute. It can be seen from the middle chart, for example that the prefetch commands for the first two tasks (prefetch1, prefetch2) are called first followed by the start command for the first task (start1) and prefetch3, start2 and main1. The upper lower charts show that the greatest overlap occurs near the middle of the queue when portions the prefetch, start, main and finish callbacks of four different tasks are running in parallel.

Where different portions of multiple tasks can be running in parallel on the same SPU it is often important to be able to synchronize tasks. Such task synchronization is useful where one task set must be completed before a subsequent task set can begin, e.g., when output data from a first set of tasks is used as input data for the following set. To facilitate such synchronization, a barrier command can be inserted into the task queue to ensure that the former tasks are completed before the following tasks begin.

FIG. 6A illustrates an example of the use of task synchronization with barrier commands. In this case a first task set 601 produces output 602 that is to be used as input 604 for a second task set 603. The output 602 is stored as data 606, e.g., in main memory. A barrier command 608 is placed between the two task sets 601, 603. The barrier command 608 may be a task in either the first task set 601 or the second task set 603. The barrier command 608 prevents the SPUS from working on tasks in the second task 603 set before the tasks from the first task set 601 have been completed.

It is possible for multiple task sets to be processed in parallel. In such a case, it is important for the barrier command to distinguish between tasks that must be synchronized with each other and those that don't. To facilitate this distinction, a barrier command may be characterized by a tag mask that identifies those task sets that need to be synchronized. The barrier command only synchronizes those tasks that are included in the tag mask. For example, a barrier mask of 0xFFFFFFFF may affect all tasks, while a barrier mask of 1<<2(0×4) only affects tasks characterized by a tag value of 2. FIG. 6B illustrates an example of the use of barrier tag masks to selectively synchronize multiple task sets. As in FIG. 6A, a first task set 601 produces generates data 606 that serves as input for a second task set 603. However, other task sets 611, 612 are being processed in parallel with the first task set 601. In this example, the output of the first task set 601 need not be synchronized with the input to task set 612. Thus the barrier command 608 between the first and second task sets 601, 602 has a tag mask that restricts its affect to the first task set 601. An SPU will be prevented from working on tasks in,the second task set 602 until the first task set 601 has been completed. However, an SPU can do work on other tasks sets not covered by the tag mask of the barrier command 608.

High performance processing can be achieved with embodiments that take advantage of code and/or data affinity. As used herein, "code affinity" refers to a situation where an SPU already has loaded in its associated local store the program code associated with a particular task. Where an SPU has code affinity with a particular task, it only has to DMA transfer the requisite data for the task. Similarly, "data affinity" refers to a situation where an SPU already has loaded in its associated local store the data associated with a particular task. Where an SPU has data affinity with a particular task it need only DMA transfer the requisite code. Since it is more efficient to process a task where SPU Kernels choose tasks that match their current SPU code. This reduces the occurrence of code switching. Please note that it is possible to cache several Type-1 programs in local store associated with an SPU and access them as needed. In such a case, code affinity is less important.

Figure 7A:
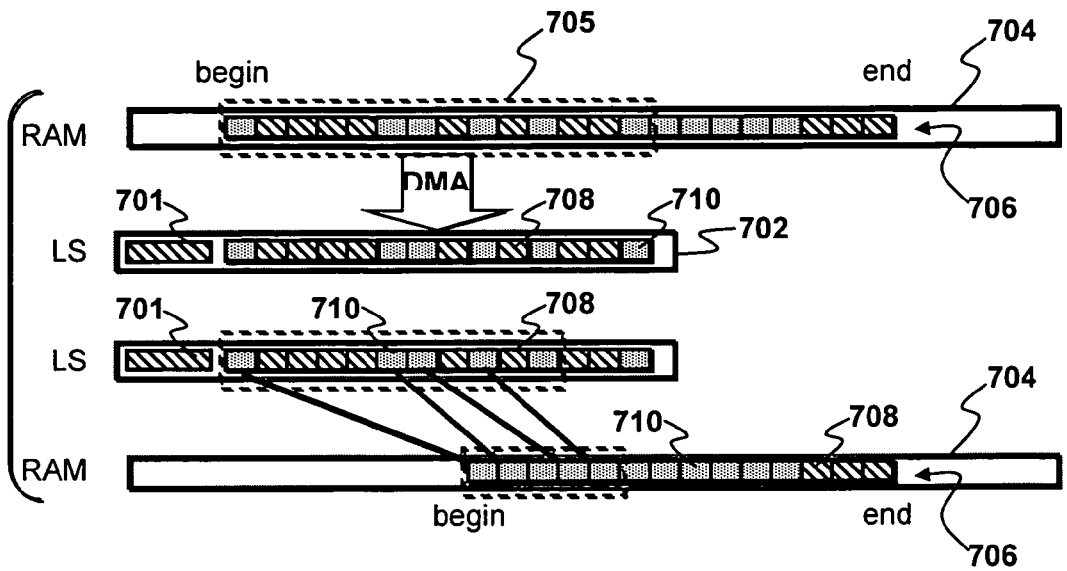
FIG. 7A is a schematic diagram illustrating SPU task management using code affinity according to an embodiment of the present invention.
Figure 7B:
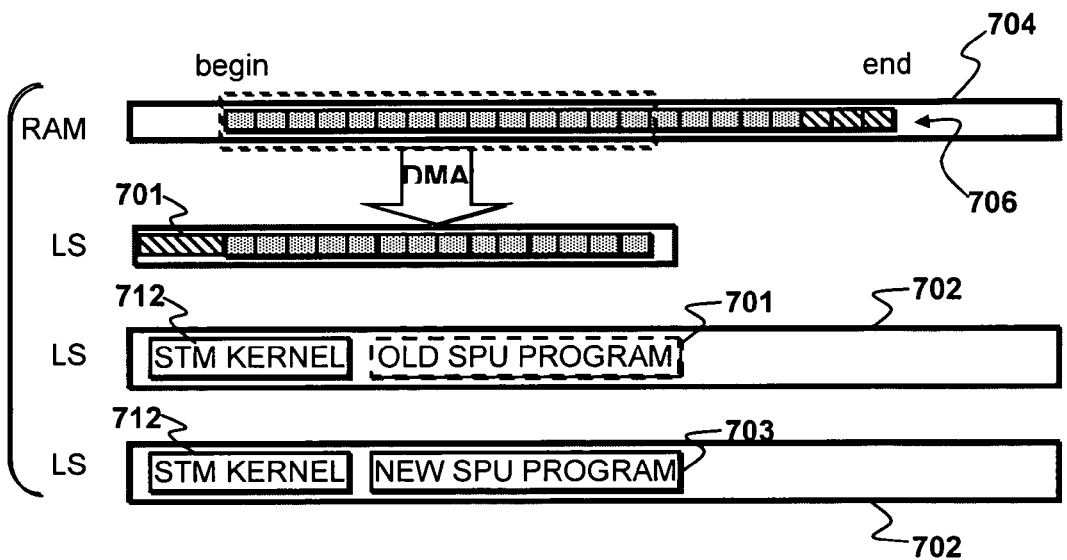
FIG. 7B is a schematic diagram illustrating a code switch according to an embodiment of the present invention.

FIG. 7A illustrates the use of code affinity. A certain code 701 is loaded on a local store 702 associated with an SPU. Main memory 704 includes a task queue 706 having multiple task definitions. The SPU loads a portion 705 of the task queue 706 into the local store 702. The task queue 706 includes definitions for tasks 708 that require the SPU's current code 701 and other tasks 710 that do not (indicated by different shading in FIG. 7). The STM kernel (not shown) selects the tasks 708 having code affinity with the current program 701 and skips the tasks 710 that do not. The kernel directs the SPU to DMA transfers the skipped tasks 710 back to main memory 706 so that the task queue 706 remains contiguous. The SPU can then process the selected tasks 708 without having to change the code 701. It should be noted that during this process, the task queue atomic mutex is locked.

There may be times when no available tasks match the current code. In such a case the SPU can switch the program code. This is the situation illustrated in FIG. 7B. Here the portion 705 of the task queue 706 contains tasks 710 that do not have code affinity with the current code 701. The kernel 712 frees the old code 701 and allocates space in the local store 702 space for new code 703 and DMA. The kernel 712 DMA transfers an ELF image of the new code 703 from main memory 704.

In embodiments of the present invention it is often desirable when an SPU 104 has completed processing a task to notify the PPU 102 or other SPUs 104 that a given task has been completed. There are different ways to accomplish this task completion notification. For example, any task or barrier can be assigned an ID that can later be polled for completion from the PPU 102. A barrier with a task ID determines when a task group is complete. SPU tasks can also be configured to send a PPU interrupt upon finishing.

The overhead associated with the STM kernel may be about 650 SPU cycles per task. This includes an averaged cost of retrieving task definitions 118 from the shared task queue 116. Once definitions are retrieved, overhead is typically minimal although it can increase if the application uses many barriers.

The cost of code switch is dependent on the size of code being switched. For example a 200 KB code switch may require about 48,000 cycles, a 100 KB code switch may require about 27,000 cycles, a 50 KB code switch may require about 17,000 cycles and a 1 KB code switch may require about 2,400 cycles.

The overhead of such code switches is also partly dependent on the configuration of the task queue and the number of SPU assigned to the task queue. In general, the worst case Tasks in queue use alternating code. In general, the worst case scenario is one where tasks requiring different code alternate in the task queue. If only one SPU is assigned to the task queue, the overhead may be about 1,840 cycles per task for a 200 KB code, about 1,520 cycles per task for a 100 KB code, about 1,360 cycles per task for a 50 KB code and about 1,200 cycles per task for a 1 KB code. If two SPU are assigned to the same task queue, the code switching overhead is about 820 cycles per task for 200 KB, 100 KB, 50 KB and 1 KB code. It would appear that optimal performance may be achieved where the number of SPUs assigned to a given task queue is equal to the number of different codes in that task queue.

FIGS. 9A-9C provide C code listings of examples of STM usage Although the examples depicted in FIGS. 9A-9C are written in C code, those of skill in the art will recognize that, any programming language could be used, including assembly language. Specifically, the code listing in FIG. 9A is an example of initialization. In this code, a PPU process initializes an STM instance. STM Kernels are launched and the PPU process adds SPU Program images. FIG. 9B is an example of a runtime (frame-based) graphics process. In this example, a new frame is started. The PPU adds SPU tasks to a queue and a barrier with an ID. The PPU does other work, such as drawing a previous frame and blocks processing of the output data until the tasks covered by the barrier are complete. The process is then repeated for another frame.

FIG. 9C illustrates an example of STM usage on an SPU. The SPU program code follows the typical sequence of prefetch( . . . ), start( . . . ),spumain( . . . ), and finish( . . . ). As described above, the prefetch( . . . ) command starts the task definition DMA. The start( . . . ) command causes the SPU to wait for task definition DMA to complete and begin input DMA as determined by the task definition. The spumain( . . . ) command causes the SPU to wait for the input DMA(s) to finish; process the input data and start DMA of the output. The finish( . . . ) command tells the SPU to wait for output DMA(s).

Figure 10:
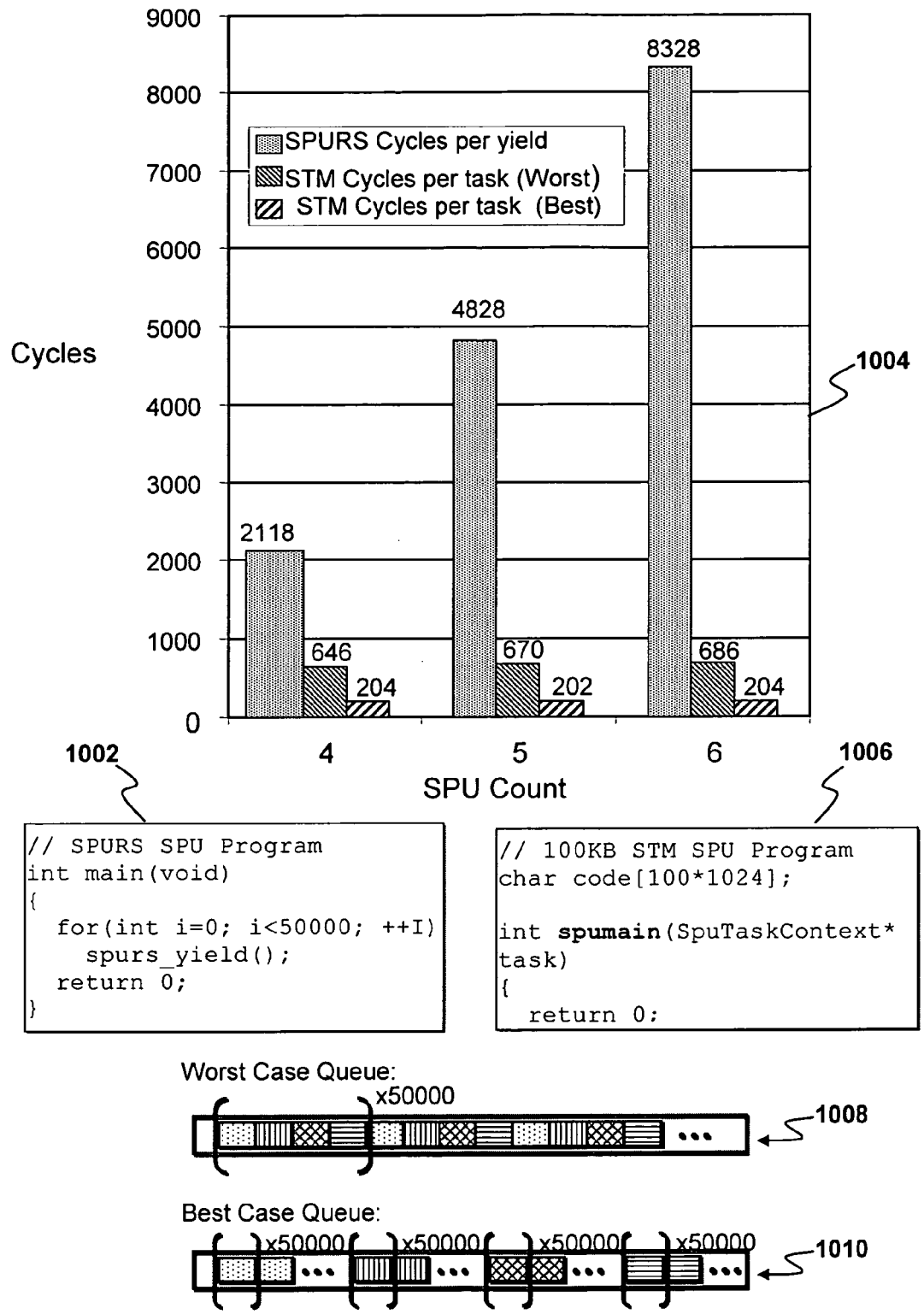
FIG. 10 is an illustrated graph of SPU performance illustrating advantages of embodiments of the present invention.

The advantages of embodiments of the present invention can be seen by comparison of task contention overhead for SPURS-based and STM-based handling of comparable task queues as shown, e.g., in FIG. 10. In this example a SPURS-based system operated on a task queue having four tasks. The SPURS-based system operated on this task queue using code 1002. As can be seen from the code, switching the tasks requires a yield call, i.e., an operation that gives another task a chance to work. The graph 1004 shows the performance of the SPURS-based system in terms of the average number of SPURS cycles per yield call. As the number of SPUs involved in the system increased from four to six, the average number of SPU cycles per yield nearly quadrupled.

By comparison a STM-based system operated on a task queue containing 4 STM SPU programs using an STM-based code 1006. The task queue was configured according to two different scenarios. In a worst case queue 1008 the four programs alternated such that no two successive tasks used the same code. In a best case queue 1010 tasks requiring the same program were always grouped together. The graph 1004 shows that even for the worst case queue 1008 the STM-based system required less than one third the number of cycles per yield call as the SPURS-based system. For the best case queue 1010 the STM-based system required less than a tenth as many cycles per yield. Furthermore, for both best and worst case queues, the number of cycles per yield call remained relatively constant.

Figure 11:
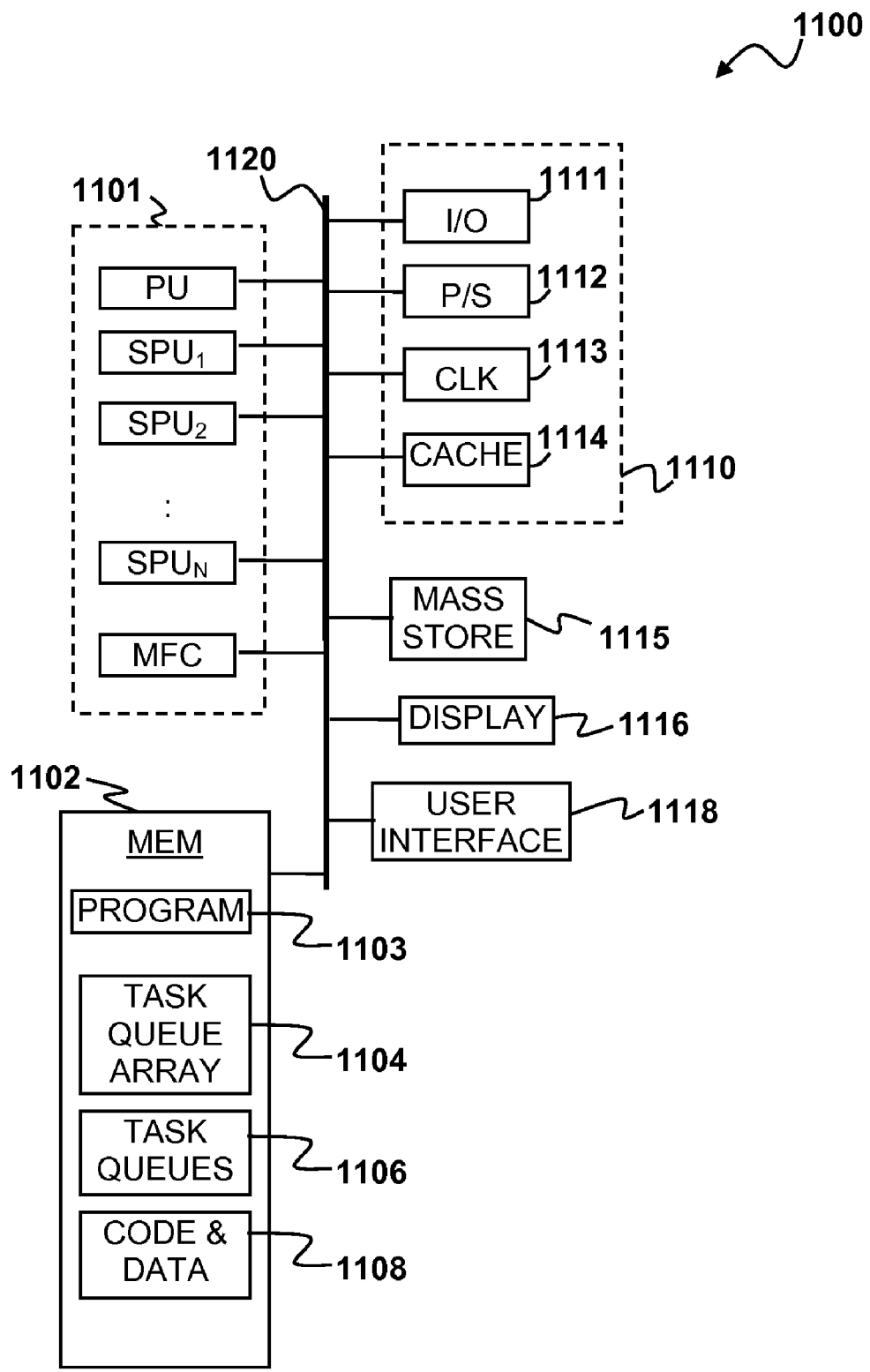
FIG. 11 is a block diagram of a data processing system according to an embodiment of the present invention.

Parallel processor units of the type depicted in FIG. 1 operating as described above may be implemented as part of a larger processing system 1100, as depicted in FIG. 11. The system 1100 may include a cell processor module 1101 and a memory 1102 (e.g., RAM, DRAM, ROM, and the like). In addition, the processing system 1100 may have multiple cell processor modules 1101. The cell processor module 1101 generally includes one or more main processors PPU and one or more SPUs $SPU_1$, $SPU_2$ . . . $SPU_N$ which may be configured to operate under the control of an SPMM as described above. The processor module 1101 may also include a memory flow controller MFC. The cell processor module 1101 may be a cell processor, e.g., of the type depicted in FIG. 1. The memory 1102 includes data and code configured as described above. Specifically, the memory includes one or more task sets 1104, task queues 1106 and code and data 1108 as described above.

The system 1100 may also include well-known support functions 1110, such as input/output (I/O) elements 1111, power supplies (P/S) 1112, a clock (CLK) 1113 and cache 1114. The system 1100 may optionally include a mass storage device 1115 such as a disk drive, CD-ROM drive, tape drive, or the like to store programs and/or data. The controller may also optionally include a display unit 1116 and user interface unit 1118 to facilitate interaction between the controller 1100 and a user. The display unit 1116 may be in the form of a cathode ray tube (CRT) or flat panel screen that displays text, numerals, graphical symbols or images. The user interface 1118 may include a keyboard, mouse, joystick, light pen or other device. The cell processor module 1101, memory 1102 and other components of the system 1100 may exchange signals (e.g., code instructions and data) with each other via a system bus 1120 as shown in FIG. 11.

As used herein, the term I/O generally refers to any program, operation or device that transfers data to or from the system 1100 and to or from a peripheral device. Every transfer is an output from one device and an input into another. Peripheral devices include input-only devices, such as keyboards and mouses, output-only devices, such as printers as well as devices such as a writable CD-ROM that can act as both an input and an output device. The term "peripheral device" includes external devices, such as a mouse, keyboard, printer, monitor, external Zip drive or scanner as well as internal devices, such as a CD-ROM drive, CD-R drive or internal modem or other peripheral such as a flash memory reader/writer, hard drive.

The processor module 1101 may manage the performance of tasks in the task queues 1106 in response to data and program code instructions of a main program 1103 stored and retrieved by the memory 1102 and executed by the PPU or SPU of the processor module 1101. Code portions of the program 1103 may conform to any one of a number of different programming languages such as Assembly, C++, JAVA or a number of other languages. The processor module 1101 forms a general-purpose computer that becomes a specific purpose computer when executing programs such as the program code 1103. Although the program code 1103 is described herein as being implemented in software and executed upon a general purpose computer, those skilled in the art will realize that the method of SPU task management could alternatively be implemented using hardware such as an application specific integrated circuit (ASIC) or other hardware circuitry. As such, it should be understood that embodiments of the invention can be implemented, in whole or in part, in software, hardware or some combination of both. In one embodiment, among others, the program code 1103 may include a set of processor readable instructions that implement a method having features in common with the method 200 of FIG. 2 and/or the code listings of FIGS. 9A-9C.

Embodiments of the present invention provide a lower overhead of context switches, allow for parallel DMA and task execution and use code affinity to choose new tasks that match current SPU code and reduce DMA usage. These advantages of embodiments of the present invention over the prior art are summarized in Table II.

TABLE II

| Feature | SPU Threads | SPURS | STM |
|---|---|---|---|
| Code Affinity (New tasks chosen match current code to reduce DMA) | No | No | Yes |
| Context Switch | Full (>256 KB × 2) | Partial (>240 KB × 2) | Code only (~50 KB × 1) |
| Parallel DMA and Task Execution | No | No | Yes |

Embodiments of the present invention provide developers with a high performance, intuitive SPU Programming model. This program model allows many different tasks to be executed efficiently without as much context switch overhead as SPURS and SPU Threads. Embodiments of the present invention provide SPU Task Management methods and systems that can run on a varying number of SPUs without modifying application code. Embodiments of the invention are particularly useful in situations requiring many short tasks many small SPU programs where there is shared data between programs and tasks. SPU code caching is also useful to optimize performance. Examples of situations where SPU task management according to embodiments of the invention may be useful include encoding or decoding of audio in situations requiring many different filter codes that must be swapped in and out of the SPU dynamically. Each filter code works on one or more data blocks from RAM. In some cases these cannot be statically defined with overlays. In such a case, the group of tasks may create a tree. Outputs from tasks lower down in the tree can become inputs for following tasks as described herein.

While the above is a complete description of the preferred embodiment of the present invention, it is possible to use various alternatives, modifications and equivalents. Therefore, the scope of the present invention should be determined not with reference to the above description but should, instead, be determined with reference to the appended claims, along with their full scope of equivalents. Any feature described herein, whether preferred or not, may be combined with any other feature described herein, whether preferred or not. In the claims that follow, the indefinite article "A", or "An" refers to a quantity of one or more of the item following the article, except where expressly stated otherwise. The appended claims are not to be interpreted as including means-plus-function limitations, unless such a limitation is explicitly recited in a given claim using the phrase "means for."

What is claimed is:

1. In a processor having a main memory, one or more central processor units and one or more secondary processing elements, each secondary processing element having a processor and a separate local memory, a method for managing tasks to be executed by one or more of the secondary processing elements, the method comprising the steps of:

under control of a task manager stored and executed on a particular secondary processing element of the one or more secondary processing elements, selecting and reading one or more task definitions stored in the main memory into the local memory of the particular secondary processing element, wherein the task definition includes a pointer to a memory address containing required code and/or data related to the task, wherein the central processor does not determine which task definition to select and read into the local memory of the particular secondary processing element;

based on information contained in the one or more task definitions, loading code and/or data related to the one or more task definitions from the main memory into the local memory of the particular secondary processing element, wherein the task definitions are accessible to the one or more secondary processing element; and performing one or more tasks with the particular secondary processing element using the code and/or data.

2. The method of claim 1 wherein reading one or more task definitions includes reading two or more task definitions.

3. The method of claim 1 wherein the code and/or data includes one or more programs characterized by position independent code that statically allocates memory space in the local memory, wherein the position independent code does not allocate local memory space for use during runtime.

4. The method of claim 1 wherein the code and/or data includes a program that dynamically allocates memory space in the local memory.

5. The method of claim 4 wherein the program is not position independent code.

6. The method of claim 1 wherein the task definition includes a size of the code and or data to be loaded into the particular secondary processing element.

7. The method of claim 1 wherein the task definition includes a maximum amount of local memory space required for input/output (I/O) direct memory access (DMA).

8. The method of claim 1 wherein two or more tasks share context buffer for task definitions and input/output (I/O) data.

9. The method of claim 1, further comprising storing output data from the one or more tasks in the main memory or in the local memory of another secondary processing element.

10. The method of claim 1, further comprising loading another task definition or other code and/or data or storing output to main memory while performing the one or more tasks with the particular secondary processing element.

11. The method of claim 1 wherein each of the one or more task definitions includes a priority.

12. The method of claim 1, wherein the one or more tasks are organized into one or more task queues.

13. The method of claim 12 wherein higher priority task queues are processed before lower priority task queues.

14. The method of claim 12 wherein the one or more task queues are circular, wherein tasks are added to an end of the queue and taken from a beginning of the task queue.

15. The method of claim 12 further comprising using the one or more central processors to add one or more tasks to one or more of the task queues.

16. The method of claim 12 further comprising restricting access to one of the task queues with an atomic mutex.

17. The method of claim 16 wherein the atomic mutex is a 128 byte atomic mutex.

18. The method of claim 16 wherein the atomic mutex includes information on an area of the main memory to lock.

19. The method of claim 16 wherein the atomic mutex includes information on whether access to the task queue is locked.

20. The method of claim 16 wherein the atomic mutex includes information about what other tasks in the task queue are in progress.

21. The method of claim 16 wherein the atomic mutex includes information about the location of other tasks in the task queue that are in progress.

22. The method of claim 16 wherein restricting access includes decrementing or incrementing a counter that notifies other secondary processing elements and/or central processors which tasks in the queue have been taken.

23. The method of claim 12 wherein one or more of the task queues includes a barrier command that ensures that one or more former tasks are completed before one or more following tasks begin.

24. The method of claim 1 wherein loading the one or more task definitions from the main memory includes reading from a task definition in a task queue a memory address of the task in the main memory.

25. The method of claim 24 wherein the memory address of the task contains both code and data.

26. The method of claim 1 wherein loading the one or more tasks from the main memory includes loading a contention for the task as part of the task definition, wherein the contention for the task is a number of secondary processing elements working on the task.

27. The method of claim 26, further comprising the step of balancing contention of the one or more tasks amongst the one or more secondary processing elements.

28. The method of claim 1 wherein loading the one or more tasks from the main memory includes loading a maximum contention and/or a minimum contention for the task.

29. The method of claim 1 wherein the one or more tasks are organized into one or more task queues, the method further comprising waiting on an atomic reservation lost event, wherein the atomic reservation lost event changes a value of a reservation bit for an atomic to a state that indicates a previous reservation has been lost.

30. The method of claim 1 wherein performing one or more tasks includes copying data from one location in the main memory to the local memory and transferring the copied data from the local memory to another location in the main memory.

31. The method of claim 1 wherein reading one or more tasks definitions includes reading with a single secondary processing element two or more task definitions in parallel with each other.

32. The method of claim 1 wherein reading one or more tasks definitions includes reading a task definition in parallel with processing data for another task on the same secondary processing element.

33. The method of claim 1 wherein reading one or more tasks definitions includes reading a task definition in parallel with processing data for another task on the same secondary processing element and also in parallel with outputting data from yet another task.

34. The method of claim 1 wherein reading one or more task definitions includes reading a task definition in parallel with outputting data from another task with the same secondary processing element.

35. The method of claim 1 wherein performing one or more tasks includes processing data from a task with a secondary processing element in parallel with outputting data from another task using the particular secondary processing element.

36. The method of claim 1 wherein performing one or more tasks includes processing data from a first task in parallel with inputting data from a second task and in parallel with reading a task definition for a third task and in parallel with outputting data for a fourth task.

37. A processor, comprising:
a main memory, the main memory containing one or more task definitions;
a central processor;
one or more secondary processing elements coupled to the central processor and the main memory, wherein each secondary processing element has a processor unit and a separate local store,
a task manager stored and executed on a particular secondary processing element of the one or more secondary processing elements, the task manager being configured to direct the secondary processing element to select and read one or more task definitions stored in the main memory into the local store of the particular secondary processing element, wherein the task definition includes a pointer to a memory address containing required code and/or data related to the task, and, based on information contained in the one or more task definitions, load code and/or data related to the one or more task definitions from the main memory into the local store of the particular secondary processing element, wherein the central processor does not determine which task definition to select and read into the local memory of the selected particular secondary processing element, wherein the task definitions are accessible to the one or more secondary processing elements.

38. The processor of claim 37 wherein each task definition includes a Priority value.

39. The processor of claim 37 wherein each task definition includes a Contention value, wherein the contention value for the task is a number of secondary processing elements working on the task.

40. The processor of claim 37 wherein each task definition includes Maximum Allowed Contention value.

41. The processor of claim 37 wherein each task definition includes a Minimum Contention value.

42. The processor of claim 37 wherein each task definition includes a State value.

43. The processor of claim 38 wherein the memory address of a work queue includes both code and data.

44. The processor of claim 37 wherein the one or more tasks are organized into one or more task queues.

45. The processor of claim 44 wherein the task manager is configured to select higher priority task queues for processing before lower priority task queues.

46. The processor of claim 44 wherein the one or more task queues are circular.

47. The processor of claim 44 wherein access to one of the task queues is restricted with an atomic mutex.

48. The processor of claim 47 wherein the atomic mutex is a 128 byte atomic mutex.

49. The processor of claim 48 wherein the 128 byte atomic mutex includes 4 bytes for a lock state, 2 bytes for a completed task count and 122 bytes containing state information for up to 488 tasks.

50. The processor of claim 47 wherein the atomic mutex includes information on an area of the main memory to lock.

51. The processor of claim 47 wherein the atomic mutex includes information on whether access to the task queue is locked.

52. The processor of claim 47 wherein the atomic mutex includes information about what other tasks in the task queue are in progress.

53. The processor of claim 47 wherein the atomic mutex includes information about the location of other tasks in the task queue that are in progress.

54. The processor of claim 47 wherein restricting access includes decrementing or incrementing a counter that notifies one or more other secondary processing elements and/or one or more central processors which tasks in the queue have been taken.

55. The processor of claim 44 wherein one or more of the task queues includes a barrier command that ensures that one or more former tasks are completed before one or more following tasks begin.

56. The processor of claim 37 wherein the code and/or data includes code configured to copy data from one location in the main memory to the local store and transferring the copied data from the local store to another location in the main memory.

57. A non-transitory processor readable medium having embodied therein a set of processor readable instructions for implementing a method for a method for managing code and data on one or more secondary processing elements in a processor having one or more central processor units and one or more secondary processing elements, each secondary processing element having a processor unit and a separate local memory, the method comprising the steps of:

under control of a task manager stored and executed on a particular secondary processing element of the one or more secondary processing elements, selecting and reading one or more task definitions stored in the main memory into the local memory of the particular secondary processing element, wherein the one or more task definitions are accessible to the one or more secondary processing elements, wherein the task definition includes a pointer to a memory address containing required code and/or data related to the task, wherein the central processor does not determine which task definition to select and read into the local memory of the particular secondary processing element;

based on information contained in the one or more task definitions, loading code and/or data related to the one or more task definitions from the main memory into the local memory of the particular secondary processing element; and performing one or more tasks with the particular secondary processing element using the code and/or data.

58. A data processing system, comprising:

one or more processors each processor having a main memory, a central processor unit, and one or more secondary processing elements, each secondary processing element having a processor and a separate local memory, wherein the main memory, central processor unit, and secondary processing elements are coupled to each other; wherein the main memory and/or local memory include processor executable instructions for implementing a method for managing code and data on one or more of the secondary processing elements, the method comprising the steps of:

under control of a task manager stored and executed on a particular secondary processing element of the one or more secondary processing element, selecting and reading one or more task definitions stored in the main memory into the local memory of the particular secondary processing element, wherein the one or more task definitions are accessible to the one or more secondary processing element, wherein the task definition includes a pointer to a memory address containing required code and/or data related to the task, wherein the central processor unit does not determine which task definition to select and read into the local memory of the selected secondary processing element;

based on information contained in the one or more task definitions, loading code and/or data related to the one or more task definitions from the main memory into the local memory of the particular secondary processing element; and performing one or more tasks with the particular secondary processing element using the code and/or data.

* * * * *